US007417982B2

(12) United States Patent
Jain et al.

(10) Patent No.: US 7,417,982 B2
(45) Date of Patent: Aug. 26, 2008

(54) HYBRID SWITCHING ARCHITECTURE HAVING DYNAMICALLY ASSIGNED SWITCHING MODELS FOR CONVERGED SERVICES PLATFORM

(75) Inventors: Rajnish Jain, West Yarmouth, MA (US); Tomas Tavares, Fall River, MA (US)

(73) Assignee: Dialogic Corporation, Montreal, Quebec (CA)

( * ) Notice: Subject to any disclaimer, the term of this patent is extended or adjusted under 35 U.S.C. 154(b) by 953 days.

(21) Appl. No.: 10/717,438

(22) Filed: Nov. 19, 2003

(65) Prior Publication Data

US 2005/0105541 A1 May 19, 2005

(51) Int. Cl.
*H04Q 11/00* (2006.01)
*H04L 12/66* (2006.01)
*H04M 3/42* (2006.01)
*G06F 15/16* (2006.01)

(52) U.S. Cl. ............... 370/352; 370/362; 370/384; 370/401; 379/88.17; 379/88.18; 379/219; 379/265.09; 709/227

(58) Field of Classification Search ................ 370/352, 370/362, 384, 401; 379/88.17, 88.18, 219, 379/265.09; 709/227
See application file for complete search history.

(56) References Cited

U.S. PATENT DOCUMENTS

| | | | | |
|---|---|---|---|---|
| 4,665,514 A * | 5/1987 | Ching et al. | ................ | 370/392 |
| 5,105,420 A * | 4/1992 | Ardon et al. | ................ | 370/216 |
| 5,828,746 A * | 10/1998 | Ardon | ........................ | 379/230 |
| 5,850,434 A * | 12/1998 | Ardon | ........................ | 379/230 |
| 6,229,887 B1 * | 5/2001 | Albers et al. | ................ | 379/219 |
| 6,650,633 B1 * | 11/2003 | Albers et al. | ................ | 370/352 |
| 6,879,266 B1 | 4/2005 | Dye et al. | | |
| 6,888,925 B2 | 5/2005 | Spitzer et al. | | |
| 6,952,407 B2 | 10/2005 | Burke | | |
| 7,031,752 B1 | 4/2006 | Locascio et al. | | |
| 7,149,300 B1 * | 12/2006 | Khan et al. | ............ | 379/212.01 |
| 2002/0016899 A1 | 2/2002 | West et al. | | |
| 2002/0154646 A1 | 10/2002 | Dubois et al. | | |
| 2003/0009343 A1 | 1/2003 | Spitzer | | |
| 2003/0051101 A1 | 3/2003 | Burger et al. | | |
| 2003/0053461 A1 | 3/2003 | Ross | | |
| 2003/0154245 A1 * | 8/2003 | Rist et al. | ................... | 709/203 |
| 2003/0219029 A1 | 11/2003 | Pickett | | |
| 2004/0010582 A1 * | 1/2004 | Oliver | ........................ | 709/224 |
| 2004/0047342 A1 * | 3/2004 | Gavish et al. | ................ | 370/352 |
| 2004/0072593 A1 * | 4/2004 | Robbins et al. | ............. | 455/560 |
| 2004/0088186 A1 * | 5/2004 | Anvekar et al. | ................ | 705/1 |

OTHER PUBLICATIONS

Rosenberg, J. et al., Network Working Group, Request for Comments: 3261, Obsoletes: 2543, Category: Standards track, "SIP: Session Initiation Protocol", dated Apr. 15, 2004, Http://www.ietf.org/rfc/rfc3261.txt, pp. 1-225.

* cited by examiner

*Primary Examiner*—Alpus H Hsu
(74) *Attorney, Agent, or Firm*—Weingarten, Schurgin, Gagnebin & Lebovici LLP

(57) ABSTRACT

A converged services platform based on a hybrid switching architecture in which either a traditional switching model or a soft-switching model may be selected on a call-by-call basis. In addition, the assigned switching model may be dynamically changed while a call is in progress in order to gain access to desired media services while avoiding network latencies and undesirable service delays.

47 Claims, 6 Drawing Sheets

HYBRID SWITCHING ARCHITECTURE HAVING DYNAMICALLY ASSIGNED SWITCHING MODELS FOR CONVERGED SERVICES PLATFORM

BACKGROUND OF THE INVENTION

1. Field of the Invention

The present invention relates generally to the field of telecommunications and, more specifically, to a converged services platform based on a hybrid switching architecture.

2. Background Information

Traditional circuit-switched telecommunications networks, including the public switched telephone network (PSTN), typically include switches in which call control signaling is fully integrated with media switching. Call processing functionality must be tightly coupled, and usually co-located, with media switching hardware in order to implement the traditional switching model. Thus, a switch which operates in accordance with the traditional model consists of a single "box" containing a call processing element (e.g., a CPU running appropriate software), a switching element (e.g., a timeslot inter-changer), one or more line cards capable of supporting desired protocols (e.g., DS3, T1, E1, J1, analog, etc.) or other interfaces (e.g., SS7, IP, etc.) and, in most instances, a capability for performing tone generation/detection, voice recorded announcements, conferencing or similar "media services" as may be required by a given application.

A major disadvantage of the traditional switching model is that, due to the tight coupling between call processing and media switching hardware, it is not particularly flexible and is not well suited to rapid development and deployment of new telecommunications services. In addition, use of the traditional switching model often requires higher capital investment to provide a given service due to the duplication of hardware at multiple locations in a large system.

In the past several years, a growing emphasis on the use of packet-switched networks to provide telecommunications services has given rise to an alternative switching model known as "soft-switching." Broadly speaking, the soft-switching model is based on a decoupling of call processing from media switching. Such decoupling provides greater flexibility for development and deployment of new services and enables construction of systems in which call processing functionality may be geographically remote from media switching hardware. Such geographical distribution is naturally compatible with packet-switched networks and provides numerous advantages, including elimination of duplicate hardware which would normally be required by use of the traditional switching model.

However, the soft-switching model exhibits disadvantageous characteristics in certain applications. For example, latencies in controlling media switching entities over packet-switched networks may be sufficiently large as to cause noticeable delays in playing tones or announcements to a subscriber, which may in turn cause the subscriber to discontinue use of service. Such an outcome is commercially unacceptable and cannot be tolerated by carriers or other service providers.

SUMMARY OF THE INVENTION

In brief summary, the present invention provides a converged services platform, based on a hybrid switching architecture, in which switching functions may be performed in accordance with either a traditional switching model or a soft-switching model. In a preferred embodiment, the choice of switching model is programmable through application software which controls the overall operation of the converged services platform. The application software may dynamically assign a switching model on a call-by-call basis. In addition, the choice of model may be dynamically changed during the duration of a call.

By allowing the application software, and thus the application developer, the flexibility to dynamically assign and change switching models on a per call basis, a highly diverse collection of applications may be optimized to very high performance in conjunction with a single converged services platform. That is, the present invention allows application developers to avoid making exclusive choices between switching models and the performance tradeoffs associated with each such model. Instead, an application developer may simply select the switching model which best suits the requirements of a given call within the application and may do so without affecting any other call.

Another advantage provided by the present invention relates to the use of media resources. Media resources, such as those needed to generate/detect tones, provide conferencing, playback voice recorded announcements and the like, are often relatively expensive components of a given system. Thus, there is usually an economic reason for minimizing such resources. With the present invention, media resources may be arranged as a media server located in a single, essentially central, location, but which may be efficiently utilized by switching hardware which is either co-located with or geographically remote from the media server.

The present invention may advantageously be used with existing switching platforms that were originally designed to operate exclusively using a traditional switching model. By making appropriate modifications and additions to the operating software of such a platform, the capabilities of the present invention may be realized in a way that both extends the useful life and increases the revenue-generating capability of existing platforms.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
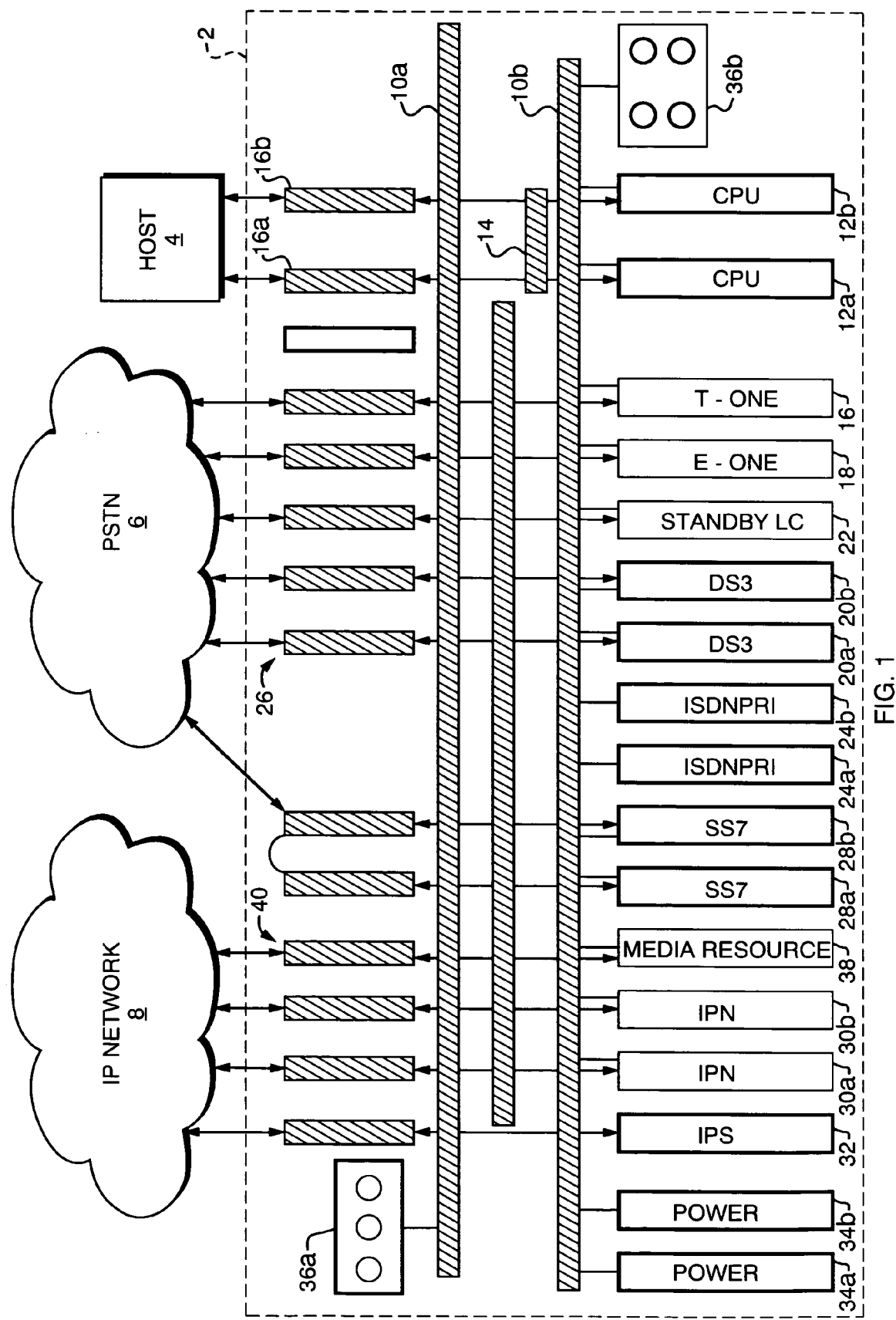
FIG. 1 is a block diagram of a converged services platform having dynamically assignable switching models in accordance with a preferred embodiment of the present invention.

FIG. 1 shows a converged service platform (CPS) 2 which is controlled by an application program (not shown) running on host cumputer 4. Hardware and software which may be used to implement a converged services platform of the type shown are available from Excel Switching Corporation of Hyannis, Massachusetts. With the inclusion of appropriate cards disscussed below, platform 2 is capable of interfacing with both the PSTN 6 and an IP network 8.

As shown, platform 2 includes redundant switching buses 10a and 10b. Redundant CPU cards 12a, 12b are connected to buses 10a, an HDLC bus 14, and to host 4 by way of input/output (I/O) cards 16a, 16b. Depending upon the requirements of a particular application, various combinations of the following "line" cards, each of which supports a particular digital telecommunications protocol, may be included within platform 2: T1 card 16; E1 card 18, DS3 cards 20a, 20b. For redundancy, a stanby card 22, which is a duplicate of one of the other line cards, may also be included. All such line cards have an associated I/O card, denoted collectively by reference number 26, which serves as an interface to PSTN 6.

If a particular application requires ISDN signaling, ISDN PRI cards 24a, 24b may be included within platform 2. Similarly, if a particular application requires SS7 signaling, SS7 cards 28a, 28b may be included. If a particular application requires IP media transport, platform 2 may include IPN cards 30a, 30b or an IPS card 32. Also, if a particular application requires media services, a media resource card 38 may be included. Cards 30, 32 and 38 each have an associated I/O card, denoted collectively by reference number 40. Power cards 34a, 34b and cooling fans 36a, 36b are also present within platform 2.

In a preferred embodiment, CSP 2 is an open, programmable, multi-service platform which, in conjunction with appropriate application software, may be used to implement a wide variety of applications including prepaid calling, interactive voice response (IVR) systems, enhanced services and many others. In applications involving IP networks, a single CSP 2 which includes at least one media resource card 38 may be used as a media server that is accessible by a number of geographically remote media gateways or other platforms. As a result, media resources need not be duplicated in multiple locations and significant savings may be realized.

Figure 2B:
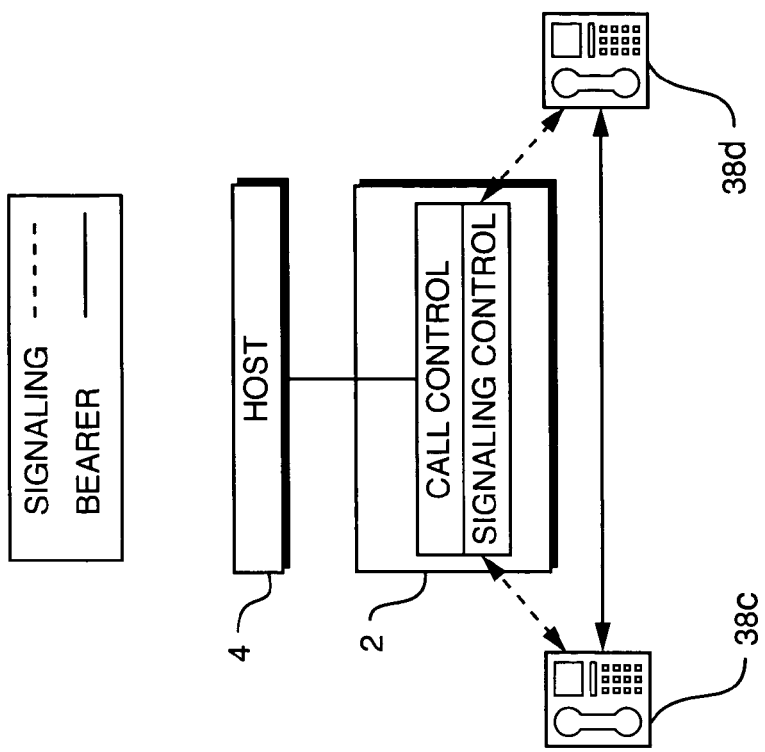
FIGS. 2A and 2B are functional block diagrams of a traditional switching model and a soft-switching model, respectively, constructed in accordance with a preferred embodiment of the present invention.
Figure 2A:
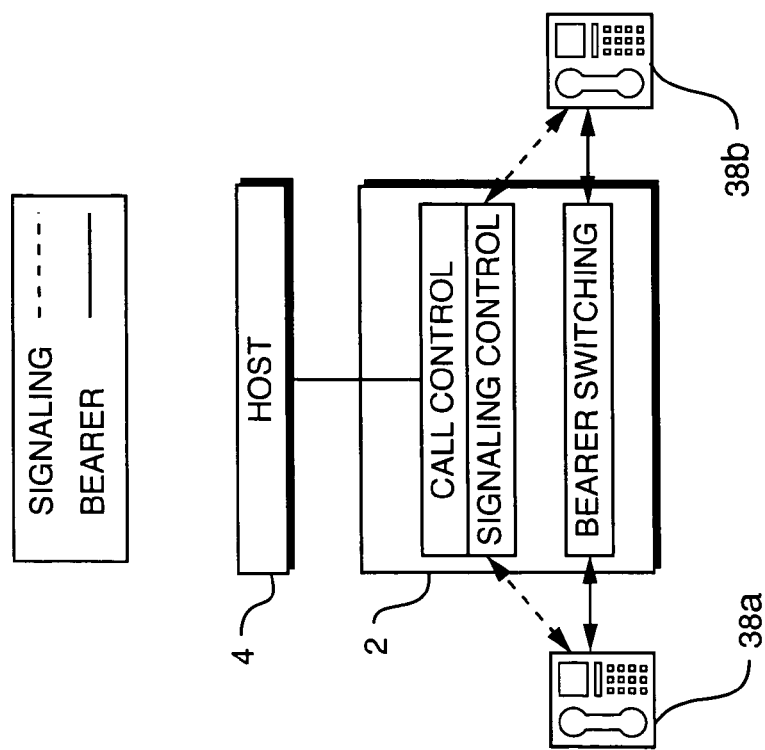

FIG. 2A shows a block diagram of a traditional switching model which may be implemented using CSP 2 of FIG. 1. In this model, call control, signaling control and bearer switching functions are all integrated within and carried out by CSP 2, in conjunction with an application running on host 4. In general, in order to initiate and ultimately connect a call between phone sets 38a and 38b, hardware consisting of an appropriate combination of cards 12, 16, 18, 20, 24, 28, 30, 32 and 38 (FIG. 1) must be used. The traditional switching model is appropriate for connecting calls between phone sets 38a and 38b which are connected to PSTN 6 or other network that does not support self-routing, connectionless communications.

In contrast, using the soft-switching model of FIG. 2B, bearer switching is no longer handled by CSP 2, which retains responsibility only for call control and signaling control. That is, no physical switching is carried out by CSP 2 with respect to a call that is assigned the soft-switching model and the only hardware of CSP 2 that is required is one of CPU cards 12 and optionally one IPN card 30 if a call, during its duration, were to be transitioned from the soft-switching model to the traditional switching model. The use of the soft-switching model is appropriate where phone sets 38c and 38b, for example, represent IP end points of IP network 8, which by definition supports self-routing, connectionless communications.

In a preferred embodiment, the assignment of either the traditional switching model or the soft-switching model may be made by the application (host 4) issuing an appropriate message to CSP 2 at the initiation of a given call. This arrangement advantageously allows an application developer to specify the switching model deemed best for a particular application. Those skilled in the art will recognize that CSP 2 may be programmed to default to a particular switching model in the absence of a message from host 4.

Figure 3:
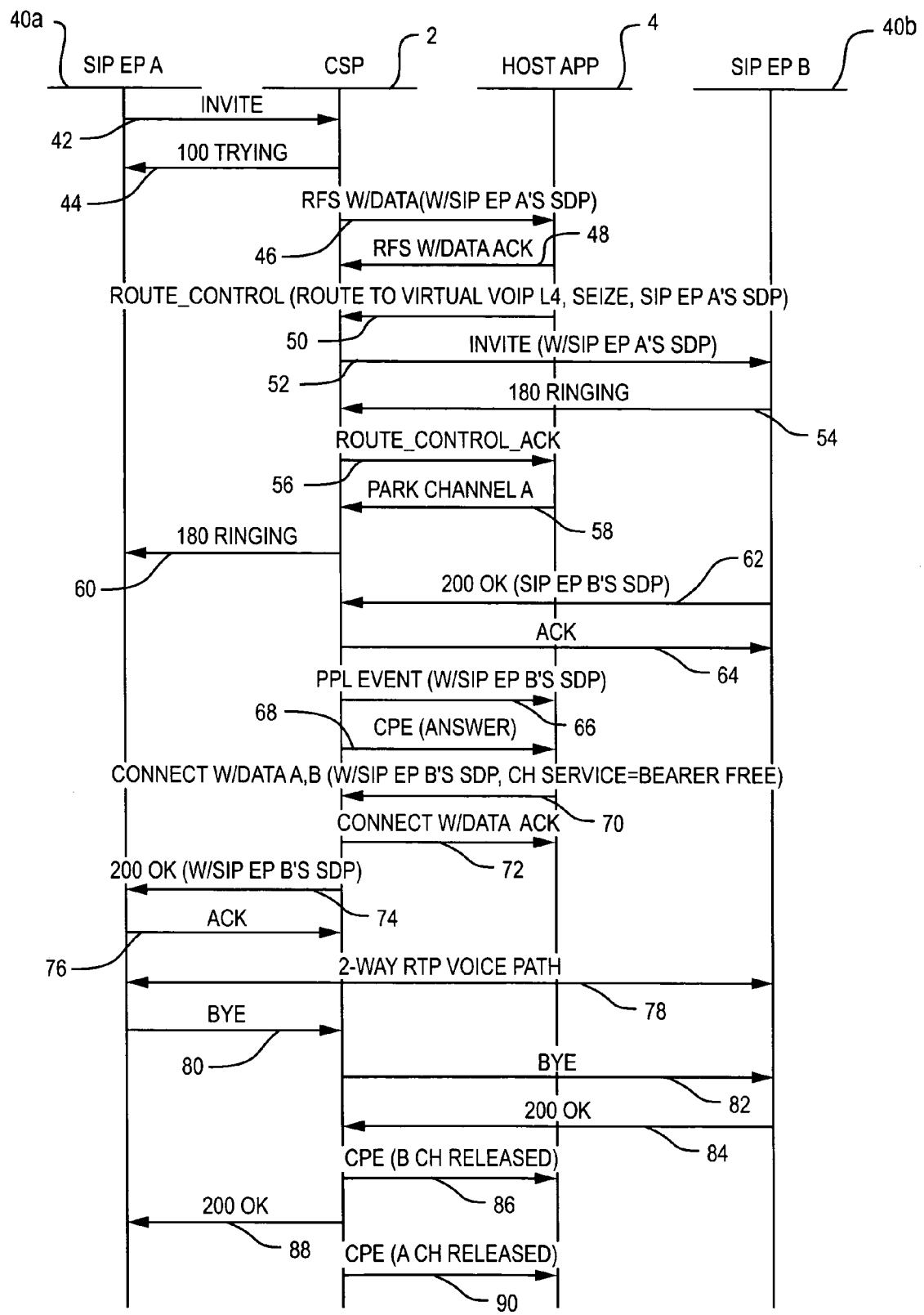
FIG. 3 is a call flow diagram illustrating a series of higher level events and messages which may be used to connect a call using the soft-switching model of FIG. 2B.

With reference now to FIGS. 1 and 3, we shall discuss an example of a call processed in accordance with the soft-switching model of FIG. 2B. In this example, reference number 40a represents a Session Initiation Protocol (SIP) End Point (EP) A and reference number 40b represents SIP EP B. The process begins with SIP EP A issuing an INVITE message 42, via IP network 8, which is received by the CPU card 12a or 12b within CSP 2. CSP 2 responds by issuing a 100 TRYING message 44 to SIP EP A. CSP 2 next issues a Request for Service (RFS) with data message 46 (the data being SIP EP A's Session Description Protocol (SDP)) to host 4, which notifies the application program that a call is beginning. The messages exchanged between the CSP 2 and host 4 belong to an application programming interface (API) provided by CSP 2 to host 4 implementers (e.g., application developers). Host 4 responds with a ROUTE_CONTROL message 50, which causes CSP to signal a call to SIP EP B using an available voice over IP (VoIP) channel.

CSP 2 responds to message 50 by issuing an INVITE message 52, which includes SIP EP A's SDP as data, to SIP EP B, which returns a 180 RINGING message 54. CSP 2 then acknowledges receipt of message 50 by returning a ROUTE_CONTROL_ACK message 56 to host 4, which responds with a PARK CHANNEL A message 58. CSP 2 then issues a 180 RINGING message 60 to SIP EP A and subsequently receives, from SIP EP B, a 200 OK message 62 which indicates that SIP EP B is available to accept the call initiated by SIP EP A. CSP 2 acknowledges receipt of message 62 by ACK message 64.

CSP 2 then issues a message 66 to host 4 which contains SIP EP B's SDP as data, thus providing the application with comparable information with respect to both SIP EP A and B. This is followed by CSP 2 issuing a CPE (answer) message 68 to host 4, which responds with a CONNECT with data message 70 instructing CSP 2 to process the call in accordance with the soft-switching model of FIG. 2B. CSP 2 acknowledges receipt of message 70 with a message 72.

CSP 2 then issues a 200 OK message 74, which contains SIP EP B's SDP, to SIP EP A. At that point, a two-way RTP voice path 78 is established between SIP EP A and B. Subsequently, SIP EP A terminates the call resulting in a BYE message 80 passing to CSP 2. CSP 2 issues a BYE message 82 to SIP EP B, which responds with a 200 OK message 84. CSP 2 then issues a CPE message 86 to inform the application that the channel previously used for SIP EP B is released, followed by a 200 OK message 88 to SIP EP A and a CPE message 90 to release the other channel.

Figure 4:
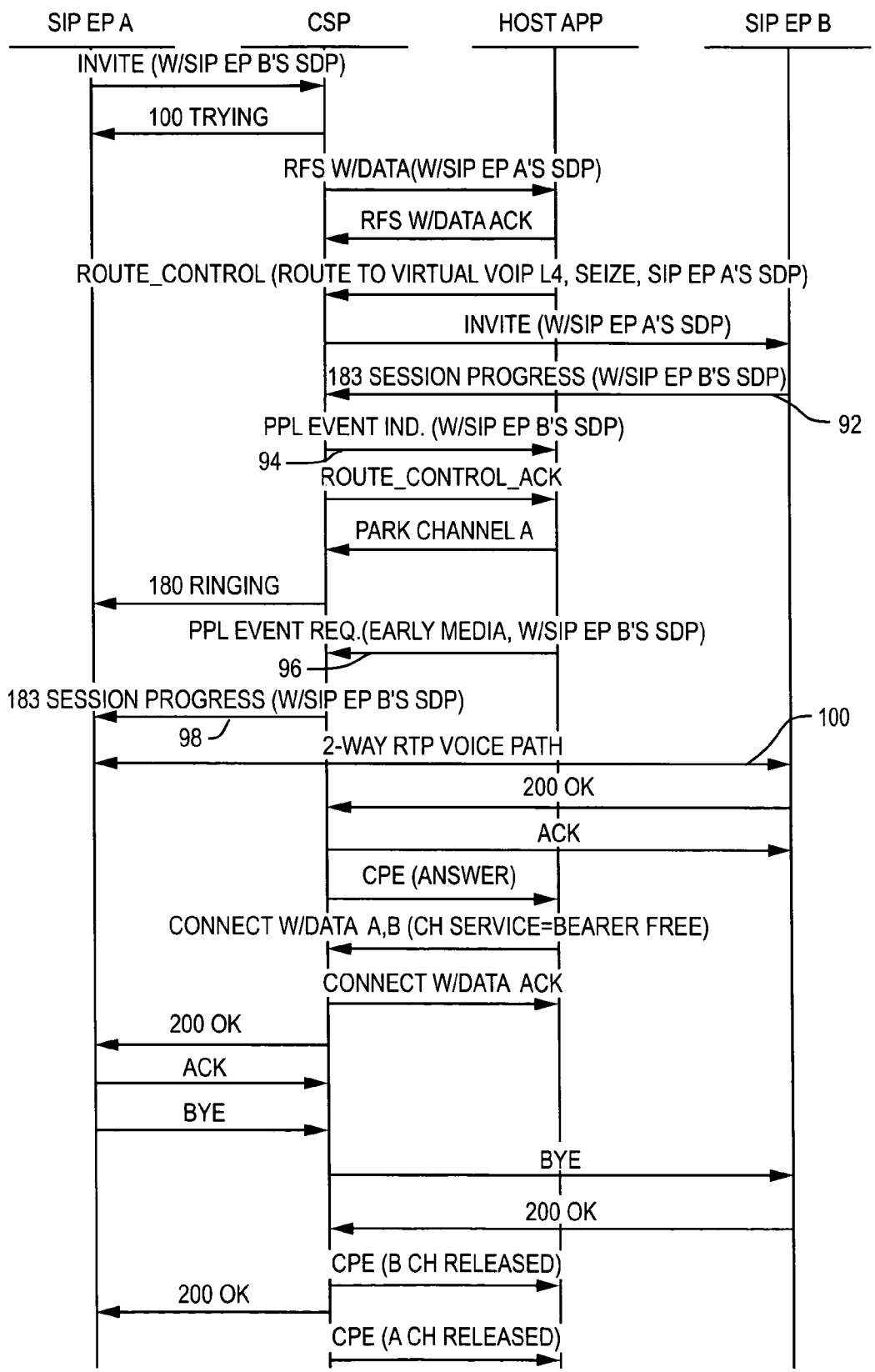
FIG. 4 is a call flow diagram illustrating connection of a call using the soft-switching model in which an early media path setup.

Turning now to FIG. 4, we shall discuss an example of a call processed in accordance with the soft-switching model of FIG. 2B, but which includes an early media path setup. In the interest of brevity, messages shown in FIG. 4 and subsequent figures which also appear in FIG. 3 are not discussed again, but such messages should be understood to perform comparable, if not identical, functions in all instances. Here, SIP EP B issues a 183 SESSION PROGRESS message 92, containing SIP EP B's SDP, to CSP 2. In response, CSP 2 issues a message 94 to host 4 informing the application of SIP EP B's SDP. Subsequently, host 4 issues a message 96 instructing CSP 2 to create an early media path between SIP EP A and B. CSP 2 responds by issuing a 183 SESSION PROGRESS message 98 to SIP EP A. At this point in the call flow, even though there has not yet been an "answer" to the call initiated by SIP EP A, there is in fact a two-way RTP early voice path 100 established between SIP EP A and B. Thus, if SIP EP B now plays a recorded announcement, it will be heard by SIP EP A.

Figure 5:
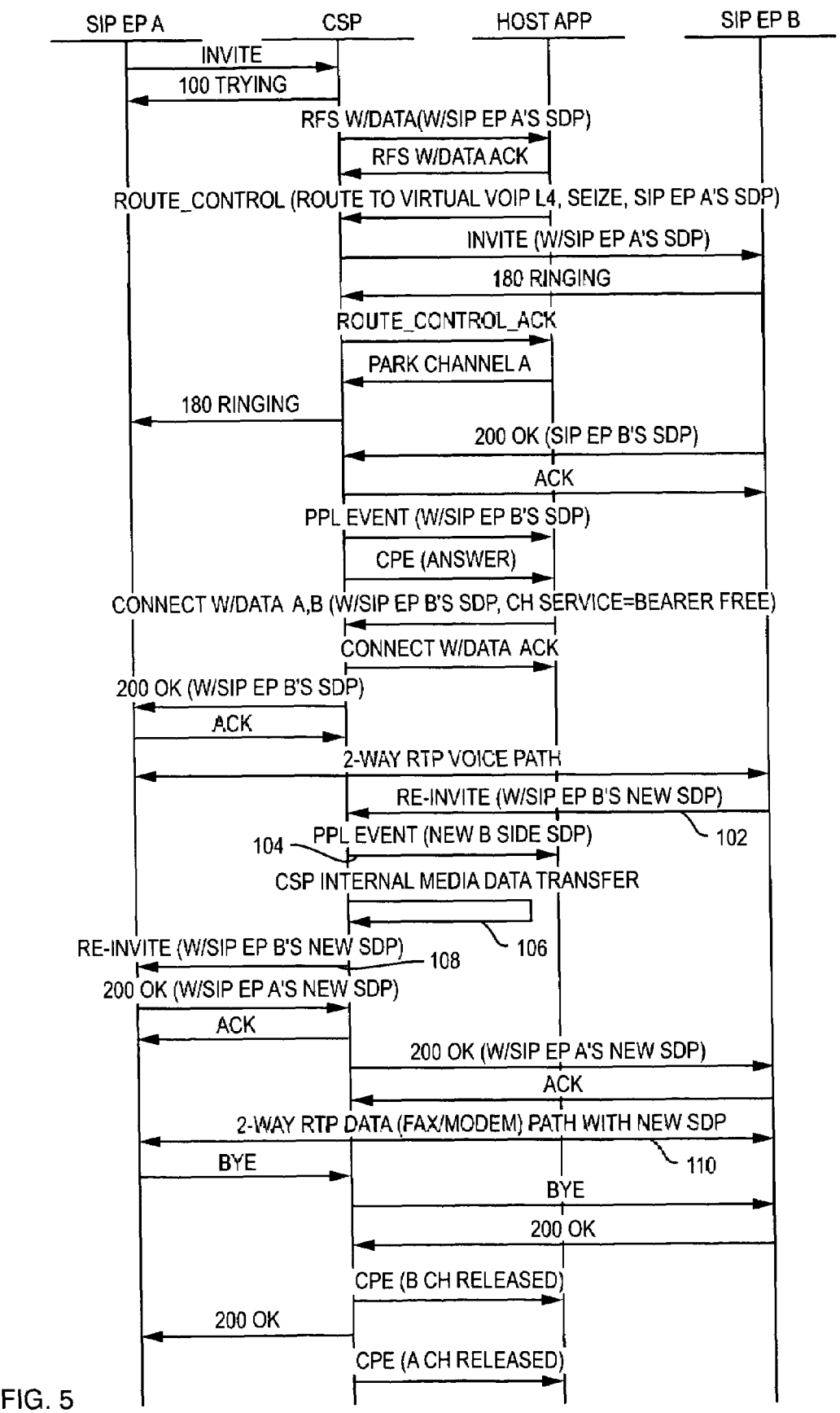
FIG. 5 is a call flow diagram illustrating a call in which a two-way voice path is changed to a two-way data path during the duration of the call.

FIG. 5 is a call flow diagram illustrating a call which begins with a two-way voice path but is transitioned to a two-way data path while in progress. An example of where this technique may be needed would be an application which begins with a voice call, perhaps prompting a user to identify themselves and progress through a menu, followed by a fax transmission or data by modem. To accommodate such an application, subsequent to the establishment of a two-way RTP voice path, a RE-INVITE message 102 containing a new SDP for SIP EP B is received by CSP 2. CSP 2 responds by issuing a message 104 to host 4 to advise the application of the change in SDP for SIP EP B. CSP 2 then executes an internal media data transfer 106 and issues a RE-INVITE message 108 to SIP EP A. Subsequently, a two-way RTP data path 110 is established between SIP EP A and B. Those skilled in the art will understand that a given call may be directed through multiple changes in assigned switching model using the disclosed techniques.

Figure 6:
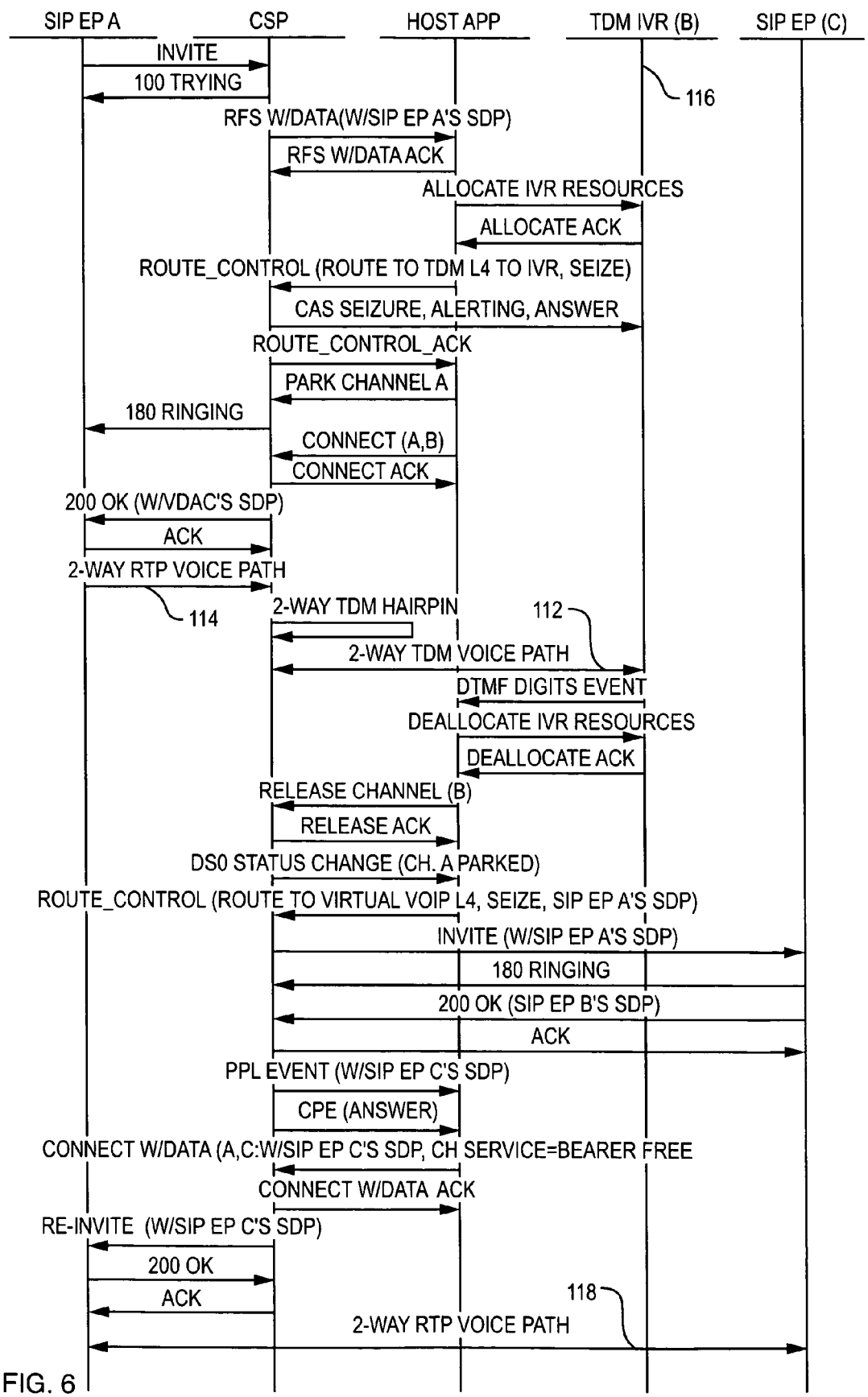
FIG. 6 is a call flow diagram illustrating an interactive voice response application in which both a two-way TDM voice path and a two-way RTP voice path are established during the duration of the call.

FIG. 6 illustrates the call flow for an application involving an interactive voice response (IVR) system 116, which may represent, for example, a prepaid calling card service, which is coupled to CSP 2 by a chosen type of time division multiplex (TDM) communication link (e.g., T1, E1, J1, DS3, etc.). In this example, a two-way RTP voice path 114 is initially established between SIP EP A and CSP 2. In addition a two-way TDM voice path 112 is established between CSP 2 and IVR system 116. Through the combination of voice paths 112 and 114, a user at SIP EP A may interact (i.e., by entering an account number and PIN, etc.) with IVR system 116. As a result of such interaction (i.e., the account is validated and the digits are collected for the call the user wishes to make), the two-way TDM voice path 112 is no longer needed and is thus released. Ultimately, a direct two-way RTP voice path 118, that bypasses CSP's media switching hardware (indicating a mid-call transition from earlier traditional switching model to soft-switching model), is established between SIP EP A and SIP EP C, representing, for example, a long distance call.

What is claimed is:

1. A method for controlling calls in a telecommunication system comprising the steps of:
   providing a first switching model which does not support self-routing connectionless communications and in which call control signaling and media switching are effectively coupled;
   providing a second switching model which does support self-routing connectionless communications and in which call control signaling and media switching are effectively decoupled, said telecommunications system being configured to switch no bearer traffic during said second switching model; and
   at the initiation of a call or during the progress of the call assigning one of said first and second switching models to said call whereby thereafter the call is processed in accordance with the assigned switching model.

2. The method as in claim 1, wherein said telecommunication system is a converged services platform (CSP).

3. The method as in claim 1, wherein said step of assigning is performed on a call-by-call basis.

4. The method as in claim 1, wherein said step of assigning is performed according to a host message.

5. The method as in claim 4, wherein said step of assigning defaults to a particular switching model in the event said host message is unavailable.

6. The method as in claim 1, wherein said step of assigning is performed dynamically one or more times during said call.

7. The method as in claim 1, further comprising the step of: providing media resources arranged on a media server.

8. The method as in claim 7, wherein said media resources are selected from a group consisting of: generating tones, detecting tones, providing conferencing, recording announcements, and playing announcement.

9. The method as in claim 7, wherein said media server is co-located with switching hardware of said telecommunication system.

10. The method as in claim 7, wherein said media server is geographically remote from said switching hardware of said telecommunication system.

11. The method as in claim 1, further comprising the step of: modifying existing telecommunication switching platforms with operating software to meet capabilities of assigning one of said first and second switching models to said call.

12. The method as in claim 1, further comprising the step of: establishing an early media path prior to receiving an answer to said initiation of said call.

13. The method as in claim 12, wherein said early media path plays a recorded announcement.

14. The method as in claim 1, further comprising the step of: transitioning between a 2-way voice path and a 2-way data path during said call.

15. The method as in claim 14, wherein said data path is used for transmitting data from a data communication device.

16. The method as in claim 1, further comprising the step of: augmenting a 2-way voice path with a 2-way data path during said call.

17. The method as in claim 16, wherein said data path is used for transmitting data from a data communication device.

18. The method as in claim 1, wherein said telecommunication system is configured as an interactive voice response (IVR) system.

19. The method as in claim 18, wherein said IVR system provides a prepaid calling service.

20. A method for controlling calls in a telecommunications system configured as an interactive voice response (IVR) system, said method comprising the steps of:
   providing a first switching model in which call control signaling and media switching are effectively coupled;
   providing a second switching model in which call control signaling and media switching are effectively decoupled;
   at the initiation of a call or during the progress of the call, assigning one of said first and second switching models to said call;
   providing a two-way RTP voice path from a first session initiation protocol end-point to a second telecommunication system having said interactive voice response system;
   establishing a two-way TDM voice path between said interactive voice response system and with said second telecommunication system;
   obtaining DTMF digits from said interactive voice response system;
   after information is obtained from said interactive voice response system:

i) issuing messages to a second session initiation protocol end-point;

ii) establishing a two-way RTP voice path between said first session initiation protocol end-point and said second session initiation protocol end-point; and iii) releasing said channel established between said interactive voice response system and said second telecommunication system; and establishing a two-way RTP voice path between said first end-point and said second end-point.

21. A method for controlling calls in a telecommunication system comprising the steps of:

providing a first switching model in which call control signaling and media switching are effectively coupled;

providing a second switching model in which call control signaling and media switching are effectively decoupled;

at the initiation of a call or during the progress of the call, assigning one of said first and second switching models to said call, and wherein assigning said second switching model includes establishing a two-way RTP voice path between a first session initiation protocol end-point and a second session initiation protocol end-point, by said telecommunication system performing the following:

i) receiving a message from said first end-point and in response thereto, issuing a Request for Service with a data message to an associated host, with Session Description Protocol data of said first end-point contained within said data message, via an application programming interface with said host;

ii) receiving a Route Control message generated by said host, and in response signaling a call to said second end-point using an available voice over IP channel;

iii) issuing to said second end-point an invite message, which includes said first end-point Session Description Protocol as data, and waiting for said second end-point to return a ringing message;

iv) in response, issuing a ringing message to said first end-point and subsequently receiving from said second end-point, an OK message indicating that said second end-point is available to accept said call initiated by said first end-point;

v) issuing a message to said host with information regarding said first and second end-points and waiting for said host to respond with a message instructing said telecommunication system to process said call in accordance with said second with said second switching model; and vi) issuing further messages to establish a two-way RTP voice path between said first and second end-points.

22. The method as in claim 21, wherein said invite message is a SIP INVITE message.

23. The method as in claim 21, further comprising the step of: establishing an early media path between said telecommunication system and said host to establish a two-way RTP early voice path between said first and second end-points.

24. The method as in claim 23, wherein said second end-point plays a recorded announcement via said RTP early voice path.

25. The method as in claim 24, wherein a media server is acting on behalf of said second end-point.

26. The method as in claim 21, further comprising the step of: transitioning from said two-way RTP voice path to a two-way RTP data path upon said telecommunication system receiving a re-invite message from said second session initiation protocol end-point.

27. The method as in claim 26, wherein said re-invite message is a SIP RE-INVITE message.

28. The method as in claim 26, further comprising the steps of:

providing an internal media data transfer at said telecommunication system; and issuing a re-invite message to said first end-point, to establish a two-way RTP Data path between said first end-point and said second end-point.

29. A telecommunication system comprising:

switching hardware having circuitry for operating under a first switching model and in which call control signaling and media switching are effectively coupled, and a second switching model which does support self-routing connectionless communications and in which call control signaling and media switching are effectively decoupled, said telecommunication system being configured to switch no bearer traffic; and a processor to assign one of said first and second switching models to said call at the initiation of a call or during the progress of the call so that thereafter the call is processed in accordance with the assigned switchiing model.

30. The telecommunication system as in claim 29, wherein said telecommunication system is a converged services platform (CSP).

31. The telecommunication system as in claim 29, wherein said processor assigns said switching models on a call-by-call basis.

32. The telecommunication system as in claim 29, wherein said processor assigns said switching models in response to a host message.

33. The telecommunication system as in claim 32, wherein said step of assigning defaults to a particular switching model in the event said host message is unavailable.

34. The telecommunication system as in claim 29, wherein said processor assigns said switching models dynamically one or more times during said call.

35. The telecommunication system as in claim 29, further comprising: a media server for providing media resources.

36. The telecommunication system as in claim 35, wherein said media resources are selected from a group consisting of: generating tones, detecting tones, providing conferencing, recording announcements, and playing announcements.

37. The telecommunication system as in claim 35, wherein said media server is co-located with switching hardware of said telecommunication system.

38. The telecommunication system as in claim 35, wherein said media server is geographically remote from said switching hardware of said telecommunication system.

39. The telecommunication system as in claim 29, further comprising: operating software for modifying existing telecommunication switching platforms to meet capabilities of assigning one of said first and second switching models to said call.

40. The telecommunication system as in claim 29, wherein an early media path is established prior to receiving an answer to said initiation of said call.

41. The telecommunication system as in claim 40, wherein said early media path is utilized for playing a recorded announcement.

42. The telecommunication system as in claim 29, wherein said switching hardware transitions between a 2-way voice path and a 2-way data path during said call.

43. The telecommunication system as in claim 42, wherein said data path is used for transmitting data from a data communication device.

44. The telecommunication system as in claim 29, wherein said switching hardware augments a 2-way voice path with a 2-way data path during said call.

45. The telecommunication system as in claim 29, wherein said telecommunication system is configured as an interactive voice response (IVR) system.

46. The telecommunication system as in claim 45, wherein said IVR system provides a prepaid calling service.

47. A telecommunication system comprising:

means for providing a first switching model which does not support self-routing connectionless communications and in which call control signaling and media switching are effectively coupled;

means for providing a second switching model which does support self-routing connectionless communications and in which call control signaling and media switching are effectively decoupled, said telecommunications system being configured to support no bearer traffic during said secondary switching model; and means for assigning one of said first and second switching models to said call at the initiation of a call or during the progress of the call so that thereafter the call is processed in accordance with the assigned switching model.

* * * * *